United States Patent
Sakurai

(10) Patent No.: US 8,450,420 B2
(45) Date of Patent: May 28, 2013

(54) POLYLACTIC ACID-CONTAINING RESIN COMPOSITIONS

(75) Inventor: Aizoh Sakurai, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 382 days.

(21) Appl. No.: 12/294,968

(22) PCT Filed: Mar. 29, 2007

(86) PCT No.: PCT/US2007/065478
§ 371 (c)(1),
(2), (4) Date: Sep. 29, 2008

(87) PCT Pub. No.: WO2007/115081
PCT Pub. Date: Oct. 11, 2007

(65) Prior Publication Data
US 2010/0240833 A1    Sep. 23, 2010

(30) Foreign Application Priority Data

Mar. 31, 2006   (JP) ................................ 2006-097917

(51) Int. Cl.
*C08G 59/32* (2006.01)
*C08G 63/91* (2006.01)
*C08G 63/08* (2006.01)
*C08F 242/00* (2006.01)

(52) U.S. Cl.
USPC ........... 525/190; 525/415; 525/411; 525/450; 525/186; 525/227; 525/231; 522/182

(58) Field of Classification Search
USPC ................. 525/92 R, 64, 190, 186, 415, 411, 525/450, 227, 231; 428/480; 522/182
See application file for complete search history.

(56) References Cited

U.S. PATENT DOCUMENTS

| | | | |
|---|---|---|---|
| 5,726,268 A | | 3/1998 | Sakamoto |
| 5,804,610 A | * | 9/1998 | Hamer et al. ................ 522/182 |
| 2005/0191483 A1 | | 9/2005 | Yoshida |
| 2007/0032577 A1 | * | 2/2007 | Kanzawa et al. ............... 524/31 |
| 2007/0276090 A1 | * | 11/2007 | Aoki et al. ...................... 525/70 |

FOREIGN PATENT DOCUMENTS

| | | |
|---|---|---|
| JP | 08-059949 | 3/1996 |
| JP | 8-208746 | 8/1996 |
| JP | 2000-506560 | 5/2000 |
| JP | 2003-286401 | 10/2003 |
| JP | 2004-010842 | 1/2004 |
| JP | 2006045487 | 2/2006 |
| JP | 2007-269995 | 10/2007 |

OTHER PUBLICATIONS

Eguiburu, J.L., et al., "Blends of amorphous and crystalline polylactides with poly(methyl methacrylate) and poly(methyl acrylate): a miscibility study", *Polymer*, vol. 39, No. 26, pp. 6891-6897, 1998.

\* cited by examiner

*Primary Examiner* — Irina Krylova
(74) *Attorney, Agent, or Firm* — Jean A. Lown

(57) ABSTRACT

A polylactic acid-containing resin composition that include (a) a polylactic acid and (b) a (meth)acrylic copolymer having a molecular weight in excess of 30,000 and that is the reaction product of a monomer mixture including a methyl (meth)acrylate (i) and a (meth)acrylic acid ester (ii) that is different than the methyl (meth)acrylate (i). The (meth)acrylic acid ester (ii) is represented by any one of formula (I): $CH_2=C(R^1)-COO-R^2$ formula (II): $CH_2=C(R^1)-COO-(CH_2CH_2O)_m-R^3$, or formula (III): $CH_2=C(R^1)-COO-(CH_2CH_2O)_n-Ph$. A method for preparing the (meth)acrylic copolymer is also provided as well as articles formed from polylactic acid-containing resin compositions.

12 Claims, No Drawings

POLYLACTIC ACID-CONTAINING RESIN COMPOSITIONS

CROSS REFERENCE TO RELATED APPLICATIONS

This application is a national stage filing under 35 U.S.C. 371 of PCT/US2007/065478, filed Mar. 29, 2007, which claims priority to Japanese Application No. 2006-097917, filed Mar. 31, 2006, the disclosure of which is incorporated by reference in its/their entirety herein.

FIELD

This disclosure relates to polylactic acid-containing resin compositions, methods for producing such compositions, and resin films and fibers formed from such compositions.

BACKGROUND

Polylactic acid (referred to herein as "PLA") is becoming an important industrial chemical because it is a biodegradable plastic that is not derived from petroleum. PLA is a renewable resource that is derived from corn, potatoes, and various plants. PLA is referred to as a carbon circulation-type plastic because it is produced from lactic acid and after use can be broken down to water and carbon dioxide through biodegradation or incineration.

PLA is transparent, has a mechanical strength at room temperature that is close to that of polyethylene terephthalate (PET), and is easily manipulated. Because of these characteristics, PLA is expected to become a general-purpose plastic material that is commonly used in daily life.

PLA does however have drawbacks based on its heat resistance, fragility, and low flexibility. Enhancing the flexibility of PLA has received much attention, and numerous methods for improving that characteristic have been proposed.

In one method of improving the flexibility, other aliphatic ester, ether or carbonate components are introduced into the polylactic acid skeleton by copolymerization in order to impart more flexibility. This method increases the cost of the resulting product because of the nature and amount of the added components.

Another method of improving the flexibility adds a plasticizer having a low molecular weight (for example, polyethylene glycol) to the PLA. However, addition of a plasticizer causes bleeding (separation) of the plasticizer from the surface, which can result in a sticky, tacky surface.

A further method adds an acrylic acid ester resin having a relatively low glass transition temperature (Tg) to the PLA (see J. L. Eguiburu et. al., *Polymer*, Vol. 39, No. 26, page 589 (1998)). Similarly, Japanese Unexamined Patent Publication (Kokai) No. 2003-286401 (JP '401) describes a PLA-containing resin composition comprising polylactic acid and a second polymer mainly comprising an unsaturated alkyl carboxylate-based unit that has a glass transition temperature of 10° C. or less. The weight average molecular weight of the second polymer is 30,000 g/mole or less. Japanese Unexamined Patent Publication (Kokai) No. 2004-10842 (JP '842) describes a PLA resin composition comprising (a) a PLA and (b) an acrylic acid ester-based oligomer having a constitutional unit represented by:

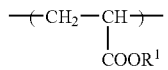

wherein $R^1$ represents an alkyl group having a carbon number of 1 to 3.

These methods provide typically do not provide a PLA resin with the desired combination of flexibility and elongation properties. Further, in some of the known compositions where a second polymeric or oligomeric material is added to the PLA and the compositions are held room temperature for several days, the second polymeric or oligomeric material can separate from the composition resulting in a sticky texture that is not useful.

Therefore, there remains a need for further methods of enhancing at least one property of a PLA composition.

SUMMARY

A PLA-containing resin composition is described that comprises (a) a PLA and (b) a (meth)acrylic copolymer having a molecular weight in excess of 30,000 g/mole. The (meth)acrylic compolymer is the polymeric reaction product of a monomer mixture that includes a methyl (meth)acrylate (i) and at least one (meth)acrylic acid ester (ii) that is not the methyl (meth)acrylate (i). The (meth)acrylic acid ester (ii) can be represented by formulas (I), (II), or (III):

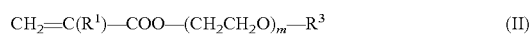

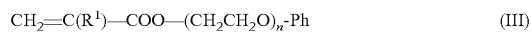

wherein
$R^1$ is —H, or —CH$_3$;
$R^2$ is a $C_2$-$C_{14}$ alkyl;
$R^3$ is —CH$_3$, or —CH$_2$CH$_3$;
Ph is —C$_6$H$_5$; and
m and n are each independently an integer that is greater than or equal to 1.

PLA-containing resin films and fibers obtained by processing PLA-containing resin compositions are also disclosed. PLA-containing resin articles obtained by processing PLA-containing resin compositions into three-dimensional articles are also disclosed.

A method for preparing the (meth)acrylic copolymer that can be used in the PLA-containing resin composition is described. The method involves combining (a) a monomer mixture capable of forming the (meth)acrylic copolymer upon polymerization by exposure to transmissive energy and (b) a packaging film for packaging the monomer mixture. The monomer mixture comprising the methyl (meth)acrylate (i) and the (meth)acrylic acid ester (ii). The packaging film comprises PLA as a main component and is transparent to the transmissive energy. The method further includes exposing the combination of the monomer mixture and the packaging film to the transmissive energy, thereby forming the (meth)acrylic copolymer upon polymerization of the monomer mixture.

DETAILED DESCRIPTION

A PLA-containing resin composition as disclosed herein comprises (a) a PLA and (b) a (meth)acrylic copolymer. In this resin composition, the (meth)acrylic copolymer comprises a methyl (meth)acrylate (i) and at least one (meth)

acrylic acid ester (ii) selected from (meth)acrylic acid esters different from the methyl (meth)acrylate (i). Furthermore, the (meth)acrylic acid ester (ii) is a (meth)acrylic acid ester of formula (I), a (meth)acrylic acid ester of formula (II), a (meth) acrylic acid ester of formula (III), or a combination thereof.

Polylactic Acid (PLA)

The polylactic acid (PLA) component that can be used in a composition as disclosed herein can include PLAs that are generally known to those of skill in the art. This can include, but is not limited to, a poly(L-lactic acid) where the constituent units comprise only L-lactic acid; a poly(D-lactic acid) where the constituent units comprise only D-lactic acid; and a poly(D/L-lactic acid) where both L-lactic acid units and D-lactic acid units are present in various ratios. Also, a copolymer of an L- or D-lactic acid with an aliphatic hydroxycarboxylic acid other than lactic acid such as glycolic acid, 3-hydroxybutyric acid, 4-hydroxybutyric acid, 4-hydroxyvaleric acid, 5-hydroxyvaleric acid, or 6-hydroxycaproic acid may be used as the PLA. Any one of these PLAs may be used alone, or two or more different PLAs may be used in combination.

The PLA used in a composition as disclosed herein can be produced by methods known to those of skill in the art. Such methods include, but are not limited to, direct dehydration-polycondensation of L-lactic acid, D-lactic acid, or both D- and L-lactic acid. The PLA may also be produced by ring-opening polymerization of lactide, which is a cyclic dimer of lactic acid. Ring-opening polymerization, if utilized, may be performed in the presence of a compound having a hydroxyl group, such as a higher alcohol and hydroxycarboxylic acid. Copolymers of lactic acid with other aliphatic hydroxycarboxylic acids can be produced by dehydration-polycondensation of lactic acid and the other aliphatic hydroxycarboxylic acid. Copolymers of lactic acid with other aliphatic hydroxycarboxylic acids may also be produced by ring-opening copolymerization of lactide with a cyclic form of the other aliphatic hydroxycarboxylic acid. Furthermore, methods such as those described in Japanese Unexamined Patent Publication (Kokai) Nos. 2003-286401 and 2004-10842 may also be used.

In some embodiments, (a) an aliphatic polyester resin containing a lactic acid unit, an aliphatic polyvalent carboxylic acid unit and an aliphatic polyhydric alcohol unit, (b) an aliphatic polyester resin containing an aliphatic polyvalent carboxylic acid and an aliphatic polyhydric alcohol, or (c) an aliphatic polyester resin containing a lactic acid unit and a polyfunctional polysaccharide may be used as the constituent unit of the PLA.

Specific examples of aliphatic polyvalent carboxylic acids include, but are not limited to, oxalic acid, succinic acid, malonic acid, glutaric acid, adipic acid, pimelic acid, suberic acid, azelaic acid, undecanoic diacid, dodecanoic diacid, anhydrides thereof, and mixtures thereof. Such aliphatic polyvalent carboxylic acids may be used as an acid anhydride or a mixture with the acid anhydride. Specific examples of aliphatic polyhydric alcohols include, but are not limited to, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, tetramethylene glycol, 1,4-cyclohexane dimethanol, and mixtures thereof.

An aliphatic polyester resin comprising a lactic acid unit, an aliphatic polyvalent carboxylic acid unit and an aliphatic polyhydric alcohol unit may be produced by reacting an aliphatic polyvalent carboxylic acid (examples of which are given above) and aliphatic polyhydric alcohol (examples of which are given above) with a polylactic acid, a copolymer of lactic acid and another hydroxycarboxylic acid, or the like. Alternatively, the aliphatic polyester resin may be produced by reacting an aliphatic polyvalent carboxylic acid and aliphatic polyhydric alcohol with lactic acid. The aliphatic polyester resin may also be produced by reacting an aliphatic polyvalent carboxylic acid and an aliphatic polyhydric alcohol with lactide, or with cyclic esters of the above-described hydroxycarboxylic acid.

An aliphatic polyester resin comprising an aliphatic polyvalent carboxylic acid and an aliphatic polyhydric alcohol can be produced by reacting an aliphatic polyvalent carboxylic acid and an aliphatic polyhydric alcohol.

Examples of polyfunctional polysaccharides for use in producing an aliphatic polyester resin containing a lactic acid unit and a polyfunctional polysaccharide include, but are not limited to, cellulose, cellulose nitrate, cellulose acetate, methylcellulose, ethylcellulose, carboxymethylcellulose, nitrocellulose, regenerated cellulose such as Cellophane®, viscose rayon and cupra, hemicellulose, starch, amylopectin, dextrin, dextran, glycogen, pectin, chitin, chitosan, derivatives thereof, and mixtures thereof. In one embodiment, cellulose acetate or ethylcellulose can be utilized as the polyfunctional polysaccharide.

An aliphatic polyester resin containing a lactic acid unit and a polyfunctional polysaccharide can be produced by reacting the polyfunctional polysaccharide with, for example, a lactic acid, a polylactic acid or a copolymer of lactic acid and another hydroxycarboxylic acid. Alternatively, an aliphatic polyester resin can be produced by reacting a polyfunctional polysaccharide with, for example, lactide, or a cyclic ester of a hydroxycarboxylic acid.

Some PLA-containing resin compositions include an aliphatic polyester resin that contains a lactic acid component, such as a homopolymer of lactic acid, a copolymer of different lactic acids (a copolymer of different lactic acids includes a copolymer of L-lactic acid and D-lactic acid, and a copolymer of a homopolymer of lactic acid and a lactate copolymer), and a copolymer of lactic acid and an aliphatic hydroxycarboxylic acid other than lactic acid. If optical transparency is desired, the lactic acid component is generally at least 50 percent by weight of the copolymer.

Other PLA-containing resin compositions include an aliphatic polyester resin comprising lactic acid, aliphatic polyvalent carboxylic acid and aliphatic polyhydric alcohol can be utilized. If optical transparency is desired, the lactic acid component is generally at least 50 percent by weight of the aliphatic polyester resin.

The molecular weight of the PLA can be chosen to provide desired physical properties of the resultant products that are formed from the PLA-containing resin composition. Therefore, the molecular weight of the PLA can vary as long as an article such as, for example, a container, film, sheet, or plate formed from the resin composition has satisfactory physical properties. Generally, as the molecular weight of the PLA is decreased, the strength of a product formed from the composition is reduced and the decomposition rate is increased. As the molecular weight of the PLA is increased, the processability of the composition decreases and forming (e.g., shaping) an article from the resin composition can become more difficult.

In an embodiment where the elongation properties of an article are important, the weight average molecular weight of the PLA is about 10,000 g/mole or more. In another embodiment where the elongation properties of an article are important, the weight average molecular weight of the PLA is about 50,000 g/mole or more. The upper limit of the weight average molecular weight does not have an appreciable effect on the ability to form a film or a sheet but is generally about 2,000,000 g/mole or less. Accordingly, in one embodiment when a film- or sheet-shaped article is to be produced, the weight average molecular weight of the PLA is usually from about 10,000 to 2,000,000 g/mole.

In one embodiment, the weight average molecular weight of the PLA is from about 10,000 to 5,000,000 g/mole as measured by gel permeation chromatography (GPC). In another embodiment, the weight average molecular weight of the PLA is generally from about 50,000 to 2,000,000 g/mole as measured by GPC. In yet another embodiment, the weight average molecular weight of the PLA is from about 70,000 to 1,000,000 g/mole as measured by GPC. In a further embodiment, the weight average molecular weight of the PLA is from about 90,000 to 500,000 g/mole as measured by GPC.

(Meth)Acrylic Copolymer

As discussed above, a PLA-containing resin composition also includes a (meth)acrylic copolymer as the second polymeric component. The (meth)acrylic copolymer comprises the polymeric reaction product of a methyl (meth)acrylate (i) and at least one (meth)acrylic acid ester (ii) selected from a (meth)acrylic acid ester that is different from the methyl (meth)acrylate (i). The (meth)acrylic acid ester (ii) is selected from a (meth)acrylic acid ester of formula (I), a (meth)acrylic acid ester of formula (II), a (meth)acrylic acid ester of formula (III), or combinations thereof:

  (I)

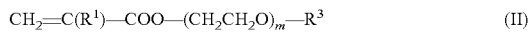  (II)

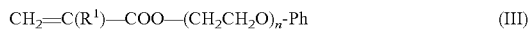  (III)

wherein
$R^1$ is —H, or —$CH_3$;
$R^2$ is a $C_2$-$C_{14}$ alkyl;
$R^3$ is —$CH_3$, or —$CH_2CH_3$;
Ph is —$C_6H_5$; and
m and n are each independently an integer that is greater than or equal to 1.

Properties of the PLA-containing resin composition such as its miscibility can be dictated, at least in part, based on the (meth)acrylic copolymer contained therein. In some embodiments, the composition can be a miscible (i.e., compatible) system blend where the methyl (meth)acrylate (i) and the (meth)acrylic acid ester (ii) are miscible (hereinafter this (meth)acrylic copolymer is sometimes referred to as a "(meth)acrylic copolymer (B1)"); or a partially miscible (i.e., partially compatible) system blend where the methyl (meth) acrylate (i) and the (meth)acrylic acid ester (ii) are partially miscible (hereinafter this copolymer is sometimes referred to as a "(meth)acrylic copolymer (B2)"). However, whether the composition is a compatible system or a partially compatible system is not necessarily entirely dictated by the (meth) acrylic copolymer used and may also vary depending on the PLA that is used. Specifically, it can be affected in part, by the kind of crystals or the difference in the crystals, for example, due to the amount of the L-form or the D-form of lactic acid in the PLA.

Miscible and Single Phase System—(Meth)Acrylic Copolymer (B1)

The (meth)acrylic copolymer (B1) can be the polymeric reaction product of a methyl (meth)acrylate (i) and at least one (meth)acrylic acid ester (ii) represented by formula (II),

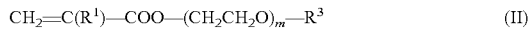  (II)

wherein
$R^1$ is —H, or —$CH_3$
m is an integer of 3 or more, and
$R^3$ is —$CH_3$ or —$CH_2CH_3$.

The resulting PLA-containing resin composition is mainly compatible. That is, the composition is a miscible blend and is a single-phase system (i.e., the composition is not separated into two or more phases).

In one embodiment, one compound of formula II may be used, and in another embodiment, two or more different compounds of formula II may be used in combination.

In an embodiment where m is 3, and the PLA is amorphous, the system is a miscible and present as a single phase. But conversely, in an embodiment where m is 3 and the PLA is crystalline, the system is partially miscible and phase-separated (i.e., the composition is not a single phase).

In one embodiment, m is an integer of 3 or more, and various compounds of formula (II) may be used as the (meth) acrylic acid ester (ii). In another embodiment, m is an integer from 3 to 23. Suitable examples of the (meth)acrylic acid ester (ii) of formula (II) include, but are not limited to, a methoxytriethylene glycol acrylate, a methoxynonaethylene glycol acrylate, and combinations thereof.

The (meth)acrylic copolymer (B1) may be prepared by copolymerizing a methyl (meth)acrylate (i) and a (meth) acrylic acid ester (ii) by any method known to one of skill in the art. In one embodiment, a free-radical copolymerization method can be used. The weight ratio of the methyl (meth) acrylate (i) to the (meth)acrylic acid ester (ii) may be varied over a wide range according to the desired composition or properties of the copolymer. Generally, the weight ratio of methyl(meth)acrylate (i) to (meth)acrylic acid ester (ii)) is from 95:5 to 30:70. For example, the weight ratio of methyl (meth)acrylate (i) to (meth)acrylic acid ester (ii) can be in the range of 95:5 to 50:50. If the content of the (meth)acrylic acid ester (ii) is less than 5 parts by weight, the flexibility that is imparted to the PLA-containing resin composition can be insufficient. If the amount of (meth)acrylic acid ester (ii) exceeds 70 parts by weight, the (meth)acrylic copolymer (B1) may be gelled by a diacrylate impurity in the (meth)acrylic acid ester (ii). However, if the diacrylate impurity in the (meth)acrylic acid ester (ii) is removed, the content of the (meth)acrylic acid ester (ii) can exceed 70 parts by weight. Optionally, other vinyl monomers may be copolymerized in the (meth)acrylic copolymer, if desired. Suitable examples of vinyl monomers for copolymerization include, but are not limited to, a (meth)acrylic acid ester, a 2-hydroxyethyl (meth) acrylate, a glycidyl (meth)acrylate, N,N-dimethylaminoethyl (meth)acrylate, and combinations thereof.

The molecular weight of the (meth)acrylic copolymer (B1) may be varied based, at least in part, on the particular (meth) acrylic acid ester (ii) utilized or on the weight ratio of the methyl(meth)acrylate (i) to (meth)acrylic acid ester (ii). In one embodiment, the (meth)acrylic copolymer (B1) has a weight average molecular weight greater than about 30,000 g/mole as measured by GPC. For example, the weight average molecular weight of the (meth)acrylic copolymer (B1) can be from about 50,000 to 2,000,000 g/mole as measured by GPC. If the weight average molecular weight of the (meth)acrylic copolymer is less than about 30,000 g/mole, bleed-out of the (meth)acrylic copolymer (B1) can occur that can age the composition and that can result in a sticky texture that is difficult to utilize. If the molecular weight of the (meth) acrylic copolymer (B1) exceeds 2,000,000 g/mole, the viscosity of the (meth)acrylic copolymer (B1) is increased and mixing it with the PLA can be difficult.

Partially Miscible and Phase-Separated System Blend—(Meth)acrylic Copolymer (B2)

The (meth)acrylic copolymer (B2) can be the polymeric reaction product of a methyl acrylate (i) and a (meth)acrylic acid ester (ii) of formula (I), (II), or (III),

  (I)

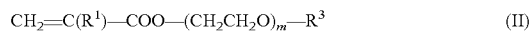  (II)

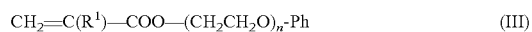  (III)

wherein
R$^1$ is —H, or —CH$_3$;
R$^2$ is a C$_2$-C$_{14}$ alkyl group;
R$^3$ is —CH$_3$ or —CH$_2$CH$_3$;
m is an integer from 1 to 3;
n is an integer of 1 or more; and
Ph is —C$_6$H$_5$.

The resulting PLA-containing resin composition is mainly a partially miscible blend and phase-separated system (the composition has more than a single phase).

In one embodiment, one compound of formulas (I), (II), or (III) may be used alone, and in another embodiment, two or more different compounds of formula (I), (II), or (III) (including two compounds of the same formula) may be used in combination.

In one embodiment, compounds of formula (I) may be used. In another embodiment, compounds of formula (I) wherein R$^2$ is a C$_2$-C$_8$ alkyl may be used. Suitable examples of the (meth)acrylic acid ester (ii) of formula (I) include, but are not limited to, ethyl acrylate, n-butyl acrylate, and combinations thereof.

In another embodiment various compounds of formula (II) may be utilized as the (meth)acrylic acid ester (ii). Suitable examples of the (meth)acrylic acid ester (ii) of formula (II) include, but are not limited to, a methoxyethyl acrylate. In some embodiments where the PLA is amorphous, a completely miscible and single phase system can be formed instead of a partially miscible and phase-separated system even under the above-described conditions.

In yet another embodiment, various compounds of formula (III) may be used as the (meth)acrylic acid ester (ii). In one embodiment, a compound of formula (III), where n is from 1 to 3 is utilized. Suitable examples of (meth)acrylic acid ester (ii) selected from formula (III) include, but are not limited to, a phenoxyethyl acrylate, phenoxytetraethylene glycol acrylate, and combinations thereof.

The (meth)acrylic copolymer (B2) may be prepared by copolymerizing a methyl (meth)acrylate (i) and a (meth)acrylic acid ester (ii) by any method known to those of skill in the art. In one embodiment, a free-radical copolymerization method can be used.

The weight ratio of the methyl (meth)acrylate (i) to the (meth)acrylic acid ester (ii) may be varied over a wide range according to the desired composition, properties of the (meth)acrylic copolymer, or properties of the PLA-containing resin in which it will be used. Generally, the weight ratio of methyl (meth)acrylate (i) to (meth)acrylic acid ester (ii)) is 95:5 to 30:70. For example, the weight ratio of methyl(meth)acrylate (i) to (meth)acrylic acid ester (ii) can be in the range of 95:5 to 50:50. If the content of the methyl (meth)acrylate (i) exceeds 95 parts by weight, the glass transition temperature of the (meth)acrylic copolymer (B2) is generally not sufficiently low and the flexibility imparted to the PLA-containing resin composition could be insufficient. If the amount of methyl(meth)acrylate (i) is less than 30 parts by weight, the miscibility between the two components decreases and the phase separation structure (i.e., phase-separated structure) of the PLA and the (meth)acrylic copolymer (B2) may be compromised. Optionally, other vinyl monomers may be copolymerized with the methyl(meth)acrylate (i) and the (meth)acrylic acid ester (ii), if desired. Suitable examples of vinyl monomers for copolymerization include, but are not limited to, a (meth)acrylic acid ester, a 2-hydroxyethyl (meth)acrylate, a glycidyl (meth)acrylate, N,N-dimethylaminoethyl (meth)acrylate, and combinations thereof.

The molecular weight of the (meth)acrylic copolymer (B2) may be varied based, at least in part, on the particular (meth)acrylic acid ester (ii) utilized, or the weight ratio of methyl (meth)acrylate (i) to (meth)acrylic acid ester (ii). In one embodiment, the (meth)acrylic copolymer (B2) has a weight average molecular weight greater than about 30,000 g/mole as measured by GPC. For example, the weight average molecular weight of the (meth)acrylic copolymer (B2) can be from about 50,000 to 2,000,000 g/mole as measured by GPC. If the weight average molecular weight of the (meth)acrylic copolymer is less than about 30,000 g/mole the (meth)acrylic copolymer can bleed out of the resin that can age the composition and that can result in a sticky texture that can be difficult to use. If the molecular weight of the (meth)acrylic copolymer (B2) exceeds 2,000,000 g/mole, the viscosity of the (meth)acrylic copolymer (B2) is increased and mixing it with the PLA can become difficult.

In one embodiment where the PLA-containing resin composition is a partially miscible and phase-separated system blend, a (meth)acrylic-based graft copolymer or a (meth)acrylic-based block copolymer may be used in combination so as to stabilize the phase separation structure.

Suitable (meth)acrylic-based graft copolymers can include, but are not limited to, various copolymers of a PLA and a (meth)acrylic polymer. Examples thereof include, but are not limited to, a (meth)acrylic-based graft copolymer where a PLA with a molecular weight of about 2,000 g/mole or more is dendritically bonded as a graft chain (branched chain) to the molecular main chain mainly comprising the polymeric reaction product of a (meth)acrylic ester. The PLA can be the same as the above-described PLA or, if desired, a PLA of another type may be used. PLAs are often highly surface active when the molecular weight is 2,000 g/mole or more, so the original function of the (meth)acrylic copolymer (B2) can be effectively brought out. Also, the graft chain comprising the PLA can play a role of minimizing breakdown of the phase-separated structure formed by the PLA and the (meth)acrylic copolymer. Examples of the (meth)acrylic acid ester of the main chain may include, but are not limited to, the polymeric reaction product of a (meth)acrylic acid, a 2-hydroxyethyl (meth)acrylate, a glycidyl (meth)acrylate, N,N-dimethylaminoethyl (meth)acrylate, a (meth)acrylic acid ester represented by one of formulas (I), (II), or (III), and combinations thereof.

Suitable (meth)acrylic-based block copolymers can include, but are not limited to, various block copolymers of PLA and a (meth)acrylic polymer. The PLA can be the same as the above-described PLA or, if desired, a PLA of another type may be used. The (meth)acrylic polymer is an optional polymer derived from a (meth)acrylic acid ester or other acrylic monomers. Examples of the (meth)acrylic acid ester and other acrylic monomers include, but are not limited to, a (meth)acrylic acid, a 2-hydroxyethyl (meth)acrylate, a glycidyl (meth)acrylate, N,N-dimethylaminoethyl (meth)acrylate, a (meth)acrylic acid ester of one of formula (I), (II), or (III), and combinations thereof. In some embodiments, the (meth)acrylic-based block copolymer can function as a compatibilizer.

Formation of (Meth)Acrylic Copolymer

In one embodiment, a (meth)acrylic copolymer can be produced by a solution polymerization method, as is known to one of skill in the art. In another embodiment, the (meth)acrylic copolymer can be produced using a non-solvent polymerization method. Such a method could be considered more environmentally friendly than a solvent based method and advantageously does not significantly adversely affect the optical properties of articles formed from the composition.

The method of producing the (meth)acrylic copolymer can include combining (a) a monomer mixture capable of forming the (meth)acrylic copolymer upon polymerization by exposure to a transmissive energy and (b) a packaging film for packaging the monomer mixture. The monomer mixture typically comprises a methyl (meth)acrylate (i) and at least one (meth)acrylic acid ester (ii). The packaging film comprises PLA as a main component and is at least partially transparent to the transmissive energy. The method further includes exposing the combination of the monomer mixture and the packaging film to the transmissive energy, thereby forming the (meth)acrylic copolymer upon polymerization of the monomer mixture.

A monomer mixture for use in this method includes a methyl (meth)acrylate (i) and at least one (meth)acrylic acid ester (ii), and may further optionally include a PLA or other resins that are compatible with the methyl (meth)acrylate (i) and the (meth)acrylic acid ester (ii). By including a PLA or other resins that are compatible, it becomes possible to increase the viscosity of the monomer mixture. The increased viscosity of the mixture can enhance handling properties of the monomer mixture.

In one embodiment, the monomer mixture also includes a photo-initiator suitable for such polymerization processes. Photo-initiators that are commonly known to those of skill in the art can be utilized herein. Examples of useful photo-initiators include, but are not limited to, substituted acetophenones such as benzyldimethylketal and 1-hydroxycyclohexyl-phenylketone; substituted alpha-ketones such as 2-methyl-2-hydroxypropynophenone; benzoin ethers such as benzoin methylether and benzoin isopropylether; substituted benzoin ethers such as anisoin methylether; aromatic sulfonylchlorides; photoactinic oximes; and others. In one embodiment, the photo-initiators may be used in an amount of about 0.001 to 5.0 parts by weight, based on 100 parts by weight of the total amount of the monomer mixture. In another embodiment, the photo-initiator may be used in an amount from about 0.01 to 5.0 parts by weight, based on 100 parts by weight of the total amount of the monomer mixture. In yet another embodiment, the photo-initiator may be used in an amount from about 0.1 to 0.5 parts by weight, based on 100 parts by weight of the total amount of the monomer mixture.

A monomer mixture, as utilized herein, generally has a viscosity that is suitable to be combined with the packaging film. In one embodiment, the viscosity of the monomer mixture is generally less than about 50,000 cps at 25° C. In another embodiment, the viscosity of the monomer mixture is generally less than about 5,000 cps at 25° C.

In one embodiment, the packaging film may be a sheet or film as would be known to one of skill in the art. In another embodiment, the packaging film is a biaxially oriented film of crystalline PLA, or a multi-layer film, such as a two-layered or three-layered film comprising a biaxially oriented film of crystalline PLA and a film of amorphous PLA applied on one surface or both surfaces of the biaxially oriented film of crystalline PLA. In embodiments where a biaxially oriented film of crystalline PLA is utilized, elution of the crystalline PLA into the acrylic polymer or melting of the PLA film with increased temperature (during exposure of the monomer mixture to transmissive energy) can be minimized.

The step of combining the monomer mixture with the packaging film can be carried out by any method known to those of skill in the art. In one embodiment, the monomer mixture can be combined with the packaging film by completely surrounding the monomer mixture with the packaging film, substantially surrounding the monomer mixture with the packaging film, providing the monomer mixture on a surface of the packaging film, or disposing the monomer mixture between two sheets of the packaging film. In embodiments where the monomer mixture is substantially or completely surrounded with the packaging film, or where the monomer mixture is provided on a surface of the packaging film, the liquid (meth)acrylic monomers and the resulting (meth)acrylic copolymers, which are usually tacky after polymerization are easier to handle.

In another embodiment, the monomer mixture and the packaging film are prepared in discrete steps. The packaging film used herein can be a rectangular or cylindrical small pouch capable of being filled with the monomer mixture. In one embodiment, the packaging film is generally a film having a thickness of about 0.01 to 0.25 mm. In one embodiment, the packaging film is generally about 0.5 to 20 percent by weight, based on the total amount of the monomer mixture and the packaging film. For example, the packaging film can be about 1 to 15 percent by weight, based on the total amount of the monomer mixture and the packaging film. If desired, the packaging film may contain optional additives that do not substantially adversely effect the transmission of the transmissive energy through the film, or other desired properties of the composition or resulting films or articles.

The pouch of the packaging film is filled with the monomer mixture that can be added, for example, from a hopper. The filling amount of the monomer mixture can vary depending on the content and size of the packaging film, but generally is in the range of about 0.1 to 500 grams.

After the monomer mixture is combined with the packaging film, the combination is irradiated with transmissive energy to start the polymerization of the monomer mixture. In one embodiment, the transmissive energy is ultraviolet (UV) radiation. The type of radiation and the conditions of radiation are not generally limited, and would be known to one of skill in the art, having read this specification. For example, the monomer mixture can be converted to the corresponding (meth)acrylic copolymer by exposing the monomer mixture to the UV radiation (for example, a UV light) having a wavelength or wavelengths of the emission spectrum of about 280 to 400 nm and an average intensity of about 0.1 to 25 mW/cm$^2$. In one embodiment, temperature can be controlled during the polymerization process. This can be accomplished, for example, by spraying cool air around the packaging film containing the monomer mixture, or by dipping the packaging film containing the monomer mixture in a water bath or a heat transmission medium. For example, the packaging film can be dipped in a water bath having a liquid temperature of about 5 to 90° C. to prevent the reaction from occurring at undesirably high temperatures.

When a pouch is utilized, the filled pouch can be irradiated with UV radiation (for example) from the outside of the pouch. The radiation is generally suitable for the polymerization of the monomer mixture. The wavelength, intensity and other conditions of the UV radiation are those described above, for example. The monomer mixture is polymerized to form the (meth)acrylic copolymer. The packaging film, in the form of the pouch, can either be removed from the (meth)acrylic copolymer before the copolymer is combined with the PLA, or the packaging film can be combined with the PLA. For example, the resulting pouch can be added to and crushed in a hopper, with the contents, (i.e., the (meth)acrylic copolymer) still in the pouch. The two materials are then melted with heat. The melted product of the (meth)acrylic copolymer can be melt-kneaded with a PLA and the kneaded product is formed (e.g., shaped) to any desired configuration. For example, the pellets may be shaped in a T-die to form a sheet-like product.

This production method of the copolymer can be utilized when the PLA-containing resin composition is produced from a combination of a (meth)acrylic monomer capable of forming a (meth)acrylic resin composition upon polymerization during exposure to transmissive energy and a packaging film for packaging the (meth)acrylic monomer that is at least substantially transparent to the transmissive energy. It is noted that the optical properties of resulting shaped articles are not substantially adversely affected when a film-shaped article is produced by the polymerization of the (meth)acrylic monomer followed by melt-kneading of the PLA and the (meth)acrylic resin composition packed in the packaging film.

The above-mentioned production method for the (meth) acrylic copolymer is not restricted to the production of the PLA-containing resin composition, and it can be applied to the production of other (meth)acrylic resin compositions.

An exemplary method for the production of the (meth) acrylic copolymer can be found in the disclosure of WO 97/33945.

PLA-Containing Resin Compositions

The PLA and the (meth)acrylic copolymer may be completely or almost completely miscible, which is also referred to as being compatible with each other or constituting a miscible and single phase system blend. The PLA and the (meth) acrylic copolymer may also constitute a partially miscible and phase-separated system blend where these two members are present in more than a single phase and are partially miscible, also referred to as being partially compatible. Whether the composition is a miscible and single phase system blend or a partially miscible and phase-separated system blend can be determined by measuring the glass transition temperature (Tg) of the composition. More specifically, if one Tg is observed during the Tg measurement using a differential scanning calorimeter (hereinafter referred to as "DSC"), this composition is miscible and a single phase system exists. On the other hand, if two glass transition temperatures are observed during the Tg measurement using DSC, the composition is partially miscible and phase-separated system exists.

The partially miscible and phase-separated system blend has a phase separation state that could be considered a "co-continuous structure". A "co-continuous structure" refers to a system where the partially miscible and phase-separated system blend sometimes has a continuous structure formed by the PLA and the (meth)acrylic copolymer together. Alternatively, the partially miscible and phase-separated system blend has a phase separation state that could be considered an "island in a sea structure". An "island in a sea structure" refers to a structure where the fine particulate (meth)acrylic copolymer (island) is almost uniformly dispersed in the PLA matrix (sea); or conversely, the fine particulate PLA (island) is almost uniformly dispersed in the (meth)acrylic copolymer matrix (sea). If the components are at least partially miscible, the miscible fraction may help to make the immiscible fraction of the blend compatible with the remainder of the blend. In one embodiment, a phase separation state of partially miscible or immiscible components can be stabilized by further adding a (meth)acrylic-based graft copolymer or a (meth) acrylic-based block copolymer.

The Tg of the PLA-rich phase and/or the Tg of the (meth) acrylic copolymer-rich phase in a partially miscible and phase-separated system blend are each shifted from the Tg of the pure components. This reveals that the (meth)acrylic copolymer is partially miscible with the PLA-rich phase, the PLA is partially miscible with the (meth)acrylic copolymer-rich phase, or both. In one embodiment, the Tg is generally shifted about 3° C.

In another embodiment, the Tg is generally shifted about 3.5° C. In yet another embodiment, the Tg is shifted about 4° C. Therefore, in one embodiment where a resin composition is in the "partially miscible" state, there are two Tg values, one derived from the PLA and one derived from the (meth) acrylic copolymer, and at least one of those Tg values is shifted towards the other Tg value.

In PLA-containing resin compositions described herein, the PLA and the (meth)acrylic copolymer may be mixed at various blending ratios. The blending ratio of the PLA and the (meth)acrylic copolymer is generally from 95:5 to 50:50 (by weight of PLA to (meth)acrylic copolymer). In one embodiment where elongation properties of an article formed from the composition are considered important, a blending ratio from 95:5 to 70:30 (by weight of PLA to (meth)acrylic copolymer) can be utilized. In another embodiment, a ratio from 95:5 to 60:40 (by weight of PLA to (meth)acrylic copolymer) can be utilized. If the amount of PLA exceeds 95 percent, the shaped article can be hard or brittle. Conversely, if the amount of (meth)acrylic copolymer exceeds 50 percent, the PLA is no longer the main component, which would somewhat frustrate the purpose of utilizing a "plant-based" renewable resource.

PLA-containing resin compositions as disclosed herein may also optionally contain an additive or additives in addition to the PLA and the (meth)acrylic copolymer. Examples of additives which can be added to the PLA-containing resin composition include, but are not limited to, fillers, pigments, nucleating agents, antioxidants, heat stabilizers, light stabilizers, antistatic agents, foaming agents, and flame retardants. Specific additives and amounts thereof would be known to one of skill in the art, having read this specification. Specific non-limiting examples of these additives include fillers such as calcium carbonate, clay, carbon black, and an impact-resistant core/shell-type particle; and pigments such as titanium oxide, metallic pigments and pearl pigments. Such additives may be added in amounts that would not adversely affect desired characteristics of the compositions or articles formed therefrom.

PLA-containing resin compositions as disclosed herein comprise a mixture of PLA, a (meth)acrylic copolymer, and optional additives. The compositions can generally be prepared by mixing the components using known methods. Appropriate mixing methods may be selected by considering the amounts and properties, for example, of the components to be mixed. Examples thereof include, but are not limited to, methods of mixing the components through the use of a solvent, and methods of mixing the components through the use of heat-melting.

PLA-containing resin compositions as disclosed herein may be formed into articles having various shapes by known methods for forming articles. For example, first the PLA and the (meth)acrylic copolymer are mixed together with any optional additives, either by dissolving them in solvent or melt-kneading them to prepare a PLA-containing resin composition. From the composition, an article, for example, a film, a sheet, a plate, or a three dimensional article can be produced from the resin composition by any method known to one of skill in the art, including, but not limited to, injection molding, extrusion blow molding, extrusion stretch-blow molding, injection blow molding, injection stretch-blow molding, inflation molding, T-die molding, or the like. In one embodiment, a post-production treatment can be carried out after the article is formed, exemplary post-production methods include, but are not limited to biaxial stretching, thermo-forming, compression molding, or the like. Alternatively, a PLA-containing fiber may also be produced by processing the PLA-containing resin composition into a fiber by methods known to those of skill in the art.

Shaped articles prepared as disclosed herein can be advantageously provided in a film or sheet form. A film and a sheet as used herein are equivalent terms and generally refer to a thin, rectangular article. In one embodiment, a film has a thickness of about 5 μm (micrometer) to about 3 mm (millimeter). In an embodiment where a shaped article is formed from a composition as disclosed herein, is stretched a film thinner than 5 μm may also be obtained. A resin film may also have a single-layer structure or a multilayer structure that has two or more layers.

In one embodiment, a resin film can be produced by melt-kneading the PLA and the (meth)acrylic copolymer (and any optional additives) and then shaping the resulting melt-kneaded product by any method known to those of skill in the art. Commonly utilized kneading methods can be utilized. For example, for mixing solid raw materials a twin-screw kneader, a Henschel mixer, a ribbon blender, or the like may be employed. The temperature at the melt-kneading stage may be varied over a wide range but is generally about 160° C. or more. Subsequently, the resulting melt-kneaded product can be shaped into a film. The method for shaping the resin into a film can be any method known to those of skill in the art including, but not limited to, T-die molding method, blow molding, and inflation molding.

In another embodiment, a resin film as disclosed herein may also be produced by using a solution casting method in place of the above-described melt-kneading method. The solution casting method may be performed by dissolving the PLA and the (meth)acrylic copolymer together with any optional additives in an appropriate solvent, casting the obtained resin solution on an appropriate substrate, and drying it.

Articles that are formed from PLA-containing resins are generally transparent, and are mechanically strong (i.e. have high tensile strengths, are flexible, and have good elongation properties). Advantageous properties that may be afforded by a PLA-containing resin composition allow the material to be used in applications where three-dimensional flowability is desired. For example, the PLA-containing resin film can be utilized as a wall material, decoration film or the like by using it as a substrate. Or more specifically, by providing a pressure-sensitive adhesive layer on one surface of the substrate, and if desired, forming an arbitrary layer such as a print layer and topcoat layer on the other surface.

EXAMPLES

The present disclosure is further described by referring to the examples below, but the present disclosure is of course not limited by these examples.

Unless otherwise specified herein, all chemicals were purchased from Wako Pure Chemical Industries, Ltd., and were used as received.

Test Procedures

The weight average molecular weight of each polymer shown below was measured in terms of standard polystyrene by gel permeation chromatography (GPC).

The glass transition temperature (Tg) of each polymer shown below was measured under a nitrogen stream by the DSC method using a differential scanning calorimeter (EXSTAR 6000, Seiko Instruments & Electronics Ltd.). Specifically, the temperature was decreased to a temperature sufficiently lower than the Tg of the sample (−40 to −80° C.), and this temperature was maintained for 10 minutes. Subsequently, the temperature was elevated at 10° C./min to 250° C. and the glass transition temperature was determined.

The mechanical properties of resin films were determined. The Young's modulus (tensile modulus), upper yield stress, and elongation percentage at break of the resin film were measured using a tensile tester (Tensilon, Model RTC-1325A, ORIENTEC Co., Ltd.). Strips having dimensions of 30 mm (length)×5 mm (width), and a thickness of about 100 μm were utilized to measure the Young's modulus, upper yield stress, and elongation percentage at break of the resin films. The measurements were taken at room temperature (25° C.) at a pull rate of 10 mm/min, and a distance between chucks of 20 mm. The measurements were performed three times for each sample, and an average value thereof was determined and reported.

The sticking test was performed to evaluate the presence or absence of bleed-out of the (meth)acrylic copolymer from films formed from PLA-containing resin compositions. The films were stored at room temperature for 1 week and then pinched between fingertips. The bleed-out of the acrylic copolymer was judged by the presence or absence of sticking. No sticking meant that the acrylic copolymer (B) was not bleeding out to the film surface.

The Inherent viscosity (IV) was measured by preparing a test sample of about 0.2 g/dl in ethyl acetate. The viscosity of the solution, which is proportional to the time it took for the solution to pass through a capillary tube, was determined in a constant temperature bath controlled at 30° C. The Inherent Viscosity (IV), which is shown in Table 5 below, is calculated as follows:

$$\ln\left[\frac{passagetimeof\ solution(seconds)}{passagetimeof\ ethylacetate(seconds)}\right] * concentration\ of\ solution(g/dl)$$

The haze values (%) were measured on a haze meter (Nippon Denshoku Kogyo).

Materials

Polymer (a)—Crystalline Polylactic Acid (PLA): LACEA® H-100 (Mitsui Chemicals, Inc.) was dried before use in a vacuum oven at 60° C. for 24 hours or more. The weight average molecular weight was 140,000 and the glass transition temperature was 55.5° C.

Polymer (b)—Amorphous Polylactic Acid: LACEA® H-280 (Mitsui Chemicals, Inc.) was dried before use in a vacuum oven at 60° C. for 24 hours or more. The weight average molecular weight was 210,000 and the glass transition temperature was 54.5° C.

Polymer (c)—Acrylic Copolymer: 70 parts by weight of methyl acrylate and 30 parts by weight of ethyl acrylate were subjected to free-radical copolymerization in a mixed solvent of ethyl acetate and toluene (50:50 weight ratio). After the product was coated in a sheet form, the solvent was removed to form the copolymer. The weight average molecular weight was 280,000 g/mole and the glass transition temperature was −2.5° C.

Polymer (d)—Acrylic Copolymer: 50 parts by weight of methyl acrylate and 50 parts by weight of ethyl acrylate were subjected to free-radical copolymerization in a mixed solvent of ethyl acetate and toluene (50:50 weight ratio). After the product was coated in a sheet form, the solvent was removed to form the polymer. The weight average molecular weight was 280,000 g/mole and the glass transition temperature was −7.0° C.

Polymer (e)—Acrylic Copolymer: 80 parts by weight of methyl acrylate and 20 parts by weight of n-butyl acrylate were subjected to free-radical copolymerization in a mixed solvent of ethyl acetate and toluene (50:50 weight ratio). After the product was coated in a sheet form, the solvent was removed to form the copolymer. The weight average molecular weight was 290,000 g/mole and the glass transition temperature was −4.5° C.

Polymer (f)—Acrylic Copolymer: 70 parts by weight of methyl acrylate and 30 parts by weight of methoxyethyl acrylate were subjected to free-radical copolymerization in a mixed solvent of ethyl acetate and toluene (57.1:42.9 weight ratio). After the product was coated in a sheet form, the solvent was removed to form the copolymer. The weight average molecular weight was 270,000 g/mole and the glass transition temperature was −9.0° C.

Polymer (g)—Acrylic Copolymer: 70 parts by weight of methyl acrylate and 30 parts by weight of methoxytriethylene glycol acrylate (Biscoat-MTG, Osaka Organic Chemical Industry Ltd.) were subjected to free-radical copolymerization in a mixed solvent of ethyl acetate and 2-butanone (50:50 weight ratio). After the product was coated in a sheet form, the solvent was removed to form the copolymer. The weight average molecular weight was 530,000 g/mole and the glass transition temperature was −20.0° C.

Polymer (h)—Acrylic Copolymer: 70 parts by weight of methyl acrylate and 30 parts by weight of methoxynanoethylene glycol acrylate (NK Ester AM-90G, Shin-Nakamura Chemical Co., Ltd.) were subjected to free-radical copolymerization in a mixed solvent of ethyl acetate and 2-butanone (44:56 weight ratio). After the product was coated in a sheet form, the solvent was removed to form the copolymer. The weight average molecular weight was 100,000 g/mole and the glass transition temperature was −34.0° C.

Polymer (i)—Acrylic Copolymer: 50 parts by weight of methyl acrylate and 50 parts by weight of methoxytriethylene glycol acrylate (Biscoat-MTG, Osaka Organic Chemical Industry Ltd.) were subjected to free-radical copolymerization in a mixed solvent of ethyl acetate and 2-butanone (50:50 weight ratio). After the product was coated in a sheet form, the solvent was removed to form the copolymer. The weight average molecular weight was 490,000 g/mole and the glass transition temperature was −36.5° C.

Polymer (j)—Acrylic Copolymer: 70 parts by weight of methyl acrylate and 30 parts by weight of phenoxyethyl acrylate were subjected to free-radical copolymerization in a mixed solvent of ethyl acetate and toluene (50:50 weight ratio). After the product was coated in a sheet form, the solvent was removed to form the copolymer. The weight average molecular weight was 250,000 g/mole and the glass transition temperature was −9.5° C.

Polymer (k)—Acrylic Copolymer: 80 parts by weight of methyl acrylate and 20 parts by weight of phenoxytetraethylene glycol acrylate (ARONIX M-102, Toagosei Co., Ltd.) were subjected to free-radical copolymerization in methyl ethyl ketone. After the product was coated in a sheet form, the solvent was removed to form the copolymer. The weight average molecular weight was 360,000 g/mole and the glass transition temperature was −5.0° C.

Polymer (l)—poly-MA (polymethyl acrylate): Methyl acrylate was subjected to free-radical polymerization in ethyl acetate and the product was then coated in a sheet form. The solvent was then removed to form the polymer. The weight average molecular weight was 250,000 g/mole and the glass transition temperature was 12.0° C.

Polymer (m)—poly-nBA (poly-n-butyl acrylate): n-butyl acrylate was subjected to free-radical polymerization in ethyl acetate and the product was then coated in a sheet form. The solvent was then removed to form the polymer. The weight average molecular weight was 400,000 g/mole and the glass transition temperature was −54.0° C.

Polymer (n)—MA-oligomer (methyl acrylate oligomer): UMM-1001 (The Soken Chemical & Engineering Co., Ltd.) was used as purchased. The weight average molecular weight was listed by Soken Chemical & Engineering as about 1,000 g/mole.

Polymer (o)—poly-EA (polyethyl acrylate): Ethyl acrylate was free-radically polymerized in a mixed solvent of ethyl acetate and toluene (50:50 weight ratio). The product was then coated in a sheet form. The solvent was then removed to form the polymer. The weight average molecular weight was 310,000 g/mole and the glass transition temperature was −18.0° C.

Polymer (p)—poly-MEA (polymethoxyethyl acrylate): Methoxyethyl acrylate was free-radically polymerized in ethyl acetate. The product was then coated in a sheet form. The solvent was then removed to form the polymer. The weight average molecular weight was 480,000 g/mole and the glass transition temperature was −40.5° C.

Film A was a heat-sealable polyethylene film having a thickness of 40 μm (Seisan Nipponsha, Ltd.).

Film B was a heat-sealable ethylene-vinyl acetate film having a thickness of 63.5 μm (Consolidated Thermoplastics Co.).

Film C was a heat-sealable biaxially oriented polylactic acid film having a thickness of 35 μm (Palgreen, Thocello Co.). Film D was a heat-sealable two-layered laminated polylactic acid film having a thickness of 75 μm. The film was produced by laminating a biaxially oriented polylactic acid film having a thickness of 35 μm (Palgreen, Thocello Co.) and an extruded non-oriented film of an amorphous polylactic acid film having a thickness of 40 μm (H280, Mitsui Chemicals).

Film E was a heat-sealable polylactic acid film having a thickness of 37 μm. The film was produced by coating a heat sealing agent, a polylactic acid resin (Biotech Color HS PL-1, Dainichi Seika Kogyo) at a thickness of 2 μm on a biaxially oriented polylactic acid film having a thickness of 35 μm (Palgreen, Thocello Co.).

Film F was a three-layered co-extruded biaxially oriented polylactic acid film having a thickness of 40 μm (EVLON® EV-HS1, Bi-Ax International Co.) that includes a core layer of a crystalline polylactic acid film with a surface layer of a heat-sealed polylactic acid on both sides.

Film G was an extruded non-oriented film of an amorphous polylactic acid film having a thickness of 40 μm (H280, Mitsui Chemicals).

Film H was an extruded non-oriented film of a crystalline polylactic acid having a thickness of 40 μm (H400, Mitsui Chemicals).

Film I was a three-layered co-extruded biaxially oriented polylactic acid film having a thickness of 40 μm that includes a core layer of a crystalline polylactic acid film (H400, Mitsui Chemicals) with a surface layer of an amorphous polylactic acid film (H280, Mitsui Chemicals) on both sides.

Monomer Mixture 1 was prepared by combining 69.8 parts by weight of methyl acrylate, 30 parts by weight of methoxy nonaethyleneglycol acrylate (NK ester AM-90G, Shin-nakamura Chemical Co.), 0.2 parts by weight of glycidyl methacrylate (Blenmer G, Nippon Yushi), 0.3 parts by weight of 2-ethylhexyl thioglycolate, as a chain transfer agent, and 0.05 parts by weight of Irgacure 651, as a UV radical initiator (Ciba Specialty Chemicals) to prepare a solution of (meth) acrylate monomer. The resulting monomer solution was bubbled with nitrogen for 10 minutes prior to use.

Monomer mixture 2 was prepared by combining 69.8 parts by weight of methyl acrylate, 30 parts by weight of methoxy nonaethyleneglycol acrylate (NK ester AM-90G, Shin-nakamura Chemical Co.), 0.2 parts by weight of glycidyl methacrylate (Blenmer G, Nippon Yushi), 0.23 parts by weight of 2-ethylhexyl thioglycolate, as a chain transfer agent, and 0.1 parts by weight of Irgacure 651, as a UV radical initiator (Ciba Specialty Chemicals) to prepare a monomer mixture.

Comparative Example 1 (C1)

Polymer (a) was melt-kneaded at 220° C. for 5 minutes with a MINI MAX MOLDER kneader (Custom Scientific Instrument Inc.). The kneaded product was hot-pressed at 200° C. to obtain a resin film having a thickness of about 100 μm. The formulation is shown in Table 1.

A sample was prepared from the resin film, and the Young's modulus, upper yield stress, and elongation percentage at break of the sample were measured as described above. The results of the measurements are shown in Tables 2 and 4. The sticking test, as described above, was also performed on the resin film, and the results are shown in Tables 2 and 4.

Comparative Examples 2 to 10 (C2-C10)

The process of Comparative Example 1 was repeated with the exception that differing amounts of Polymers (a), (l), (m), and (n) were used. The formulations are shown in Table 1.

The Young's modulus, upper yield stress, and elongation percentage at break of the samples were measured as described above. Sticking tests were also performed on all of the samples. The results of these tests are shown in Table 2 below.

Examples 1 to 8

The process of Comparative Example 1 was repeated with the exception that differing amounts of polymers (a), (b), (g), (h), and (i) were used. The formulations are shown in Table 1.

The Young's modulus, upper yield stress, and elongation percentage at break of the sample were measured as described above. Sticking tests were also performed on all of the samples. The results of these tests are shown in Table 2 below.

In Table 1, the Example numbers refer to the formulations given above; the polymers refer to those listed under Materials above, and the amounts of the polymers are provided in parts by weight.

TABLE 2

| Example No. | Glass transition temperature, Tg (° C.) | Young's Modulus, E (Pa) | Upper Yield Point (MPa) | Elongation Percentage at Break (%) | Sticking Test |
|---|---|---|---|---|---|
| C1 (Polymer (a)) | 55.5 | $1.7 \times 10^9$ | 47.0 | 20 | None |
| Polymer (b) | 54.5 | — | — | — | None |
| Polymer (g) | −20.0 | — | — | — | Sticking |
| Polymer (h) | −34.0 | — | — | — | Sticking |
| Polymer (i) | −36.5 | — | — | — | Sticking |
| Polymer (l) | 12.0 | — | — | — | Sticking |
| Polymer (m) | −54.0 | — | — | — | Sticking |
| 1 | 15.0 | $0.81 \times 10^9$ | 41.4 | 47 | None |
| 2 | 11.5 | $0.68 \times 10^9$ | 26.0 | 163 | none |
| 3 | 12.5 | $0.22 \times 10^9$ | 11.7 | 358 | none |
| 4 | 15.0 | $0.45 \times 10^9$ | 22.9 | 222 | none |
| 5 | 14.5 | $0.42 \times 10^9$ | 19.6 | 401 | none |
| 6 | 10.5 | $0.32 \times 10^9$ | 16.9 | 352 | none |
| 7 | 17.0 | $0.62 \times 10^9$ | 29.3 | 262 | none |
| 8 | 1.0 | $0.13 \times 10^9$ | 7.9 | 393 | none |
| C2 | 40.5 | — | — | — | none |
| C3 | 37.0 | $1.12 \times 10^9$ | 45.2 | 9 | none |
| C4 | 31.0 | $1.03 \times 10^9$ | 40.4 | 10 | none |
| C5 | 29.5 | $0.75 \times 10^9$ | 39.1 | 12 | none |
| C6 | 18.0 | $0.55 \times 10^9$ | 29.4 | 71 | none |
| C7 | 17.5 | $0.15 \times 10^9$ | 5.6 | 32 | None |
| C8 | 55.5/−49.0* | — | — | — | sticking |
| C9 | 53.4/32.4* | $1.17 \times 10^9$ | 49.8 | 35 | slight sticking |
| C10 | 51.0/29.5* | $0.21 \times 10^9$ | 12.1 | 223 | heavy sticking |

*Derived from the (meth)acrylic copolymer

The PLA-containing resin compositions prepared by blending polymers (g), (h), (i) and (l) and polymer (a) (Examples 1 to 8 and Comparative Examples 3 to 7 and 10) were compared to the composition having 100% polymer (a) (Comparative Example 1). The (meth)acrylic copolymer acts as a polymer plasticizer which can impart flexibility. Conversely, the PLA-containing resin composition prepared by blending polymer (m) with polymer (a) (Comparative Example 8) has two glass transition temperatures. The two Tg are neither a decreased Tg of polymer (a) nor an increased Tg of polymer (m). This shows that this resin composition is completely phase separated into two components. Also, this

TABLE 1

| | Polylactic acid (A) | | (Meth)acrylic Copolymer (B) | | | Other Polymer or Oligomer | | |
|---|---|---|---|---|---|---|---|---|
| Example No. | Polymer (a) | Polymer (b) | Polymer (g) | Polymer (h) | Polymer (i) | Polymer (l) | Polymer (m) | Oligomer (n) |
| C1 | 100 | | | | | | | |
| 1 | 75 | | 25 | | | | | |
| 2 | 70 | | 30 | | | | | |
| 3 | | 60 | 40 | | | | | |
| 4 | 70 | | | 30 | | | | |
| 5 | | 70 | | 30 | | | | |
| 6 | | 70 | | | 30 | | | |
| 7 | | 70 | 30 | | | | | |
| 8 | | 50 | 50 | | | | | |
| C2 | 75 | | | | | 25 | | |
| C3 | 70 | | | | | 30 | | |
| C4 | 60 | | | | | 40 | | |
| C5 | 50 | | | | | 50 | | |
| C6 | 40 | | | | | 60 | | |
| C7 | 30 | | | | | 70 | | |
| C8 | 75 | | | | | | 25 | |
| C9 | 80 | | | | | | | 20 |
| C10 | 70 | | | | | | | 30 | resin composition does not have a stable phase separation structure, as seen from the bleed-out of polymer (m) to the surface.

When comparing the PLA-containing resin compositions prepared by blending polymers (g), (h) or (i) and polymer (a) with and a composition having 100% polymer (a), it can be seen that the elongation percentage at break is increased in the blended compositions.

The PLA-containing resin compositions prepared by blending polymer (l) and polymer (a) (Comparative Examples 3 to 7) do not show improvements in the elongation property, except at a ratio of 40:60 (polymer (a) to polymer (l)) over the composition with 100% polymer (a).

The PLA-containing resin compositions prepared by blending oligomer (n) with polymer (a) (Comparative Examples 9 and 10) did not exhibit sticking immediately, but phase separation occurred at room temperature after the film was aged. The phase separation therefore generated sticking Comparative Examples 11 and 12 (C11 and C12)

The process of Comparative Example 1 was repeated with the exception that differing amounts of polymer (a), (o), and (p) were utilized. The formulations are shown in Table 3.

The Young's modulus, upper yield stress, and elongation percentage at break of the samples were measured as described above. Sticking tests were also performed on all of the samples. The results of these tests are shown in Table 4 below.

Examples 9 to 17

The process of Comparative Example 1 was repeated with the exception that differing amounts of polymers (a), (c), (d), (e), (f), (j) and (k) were utilized. The formulations are shown in Table 3.

The Young's modulus, upper yield stress, and elongation percentage at break of the samples were measured as described above. Sticking tests were also performed on all of the samples. The results of these tests are shown in Table 4 below.

In Table 3, the Example numbers refer to the formulations given above; the polymers refer to those listed under Materials above, and the amounts of the polymers are provided in parts by weight.

TABLE 4

| Example No. | Glass transition temperature, Tg (° C.) | Young's Modulus, E (Pa) | Upper Yield Point (MPa) | Elongation Percentage at Break (%) | Sticking Test |
|---|---|---|---|---|---|
| C1 | 55.5 | $1.7 \times 10^9$ | 47.0 | 20 | none |
| Polymer (a) | | | | | |
| Polymer (c) | −2.5 | — | — | — | sticking |
| Polymer (d) | −7.0 | — | — | — | sticking |
| Polymer (e) | −4.5 | — | — | — | sticking |
| Polymer (f) | −9.0 | — | — | — | sticking |
| Polymer (j) | 9.5 | — | — | — | sticking |
| Polymer (k) | −5.0 | — | — | — | sticking |
| Polymer (o) | −18.0 | — | — | — | sticking |
| Polymer (p) | −40.5 | — | — | — | sticking |
| 9 | 49.0/4.0* | $0.88 \times 10^9$ | 47.4 | 36 | none |
| 10 | 40.0/2.5* | $0.84 \times 10^9$ | 38.8 | 187 | none |
| 11 | 36.5/2.5* | $0.40 \times 10^9$ | 23.4 | 249 | none |
| 12 | 37.0/3.0* | $0.21 \times 10^9$ | — | 393 | none |
| 13 | 42.5/−3.5* | $0.70 \times 10^9$ | 32.3 | 49 | none |
| 14 | 51.0/1.0* | $0.61 \times 10^9$ | 24.1 | 93 | none |
| 15 | 45.0/4.0* | $0.69 \times 10^9$ | 28.3 | 52 | none |
| 16 | 53.5/12.5* | $0.86 \times 10^9$ | 37.7 | 155 | none |
| 17 | 47.5/9.0* | $0.73 \times 10^9$ | 35.0 | 52 | none |
| C11 | 53.0/−21.5* | $0.74 \times 10^9$ | 25.9 | 18 | sticking |
| C12 | 52.5/−40.5* | $0.79 \times 10^9$ | 31.1 | 24 | sticking |

*Derived from (meth)acrylic copolymer (B).

By comparing the Young's modulus, upper yield stress, and elongation percentage at break of PLA-containing resin compositions that include polymers (c), (d), (e), (f), (j) or (k) and polymer (a) (Examples 9 to 17) with a resin composition that is 100% polymer (a), it can be seen that the flexibility is increased.

Conversely, the PLA-containing resin compositions that include polymers (o) or (p) and polymer (a) (Comparative Examples 11 and 12) have decreased glass transition temperatures, revealing that these resin compositions are completely phase separated into two components. Also, the phase separation structure in this composition is not stable which causes bleed-out of the (meth)acrylic copolymer to the surface. Comparative Examples 11 and 12 also show that the elongation percentage at break is not improved from a composition having 100% polymer (a).

Examples 18-26

Pouches were produced by preparing rectangular pieces of Films A to I having a length of 5 cm and a width of 10 cm. Each packaging film was folded in half in such a manner that

TABLE 3

| | PLA (A) | (Meth)acrylic Copolymer (B) | | | | | | Other Polymer | |
|---|---|---|---|---|---|---|---|---|---|
| Ex. No. | Polymer (a) | Polymer (c) | Polymer (d) | Polymer (e) | Polymer (f) | Polymer (j) | Polymer (k) | Polymer (o) | Polymer (p) |
| C1 | 100 | | | | | | | | |
| 9 | 75 | 25 | | | | | | | |
| 10 | 70 | 30 | | | | | | | |
| 11 | 60 | 40 | | | | | | | |
| 12 | 50 | 50 | | | | | | | |
| 13 | 75 | | 25 | | | | | | |
| 14 | 75 | | | 25 | | | | | |
| 15 | 75 | | | | 25 | | | | |
| 16 | 70 | | | | | 30 | | | |
| 17 | 70 | | | | | | 30 | | |
| C11 | 75 | | | | | | | 25 | |
| C12 | 75 | | | | | | | | 25 | the heat seal side of the film (if the particular film had a heat-sealed layer) is on the inside. The lateral ends and bottom end of the film were heat-sealed in an impulse heater to obtain a rectangular small container (length 5 cm×width 5 cm). Then, 10 g of monomer mixture 1 as prepared above was added to each container. The upper end of the container was then heat sealed to produce a pouch containing monomer mixture 1. The temperature of the heat sealing was 90° C. for Films A, B, G, H and I, and 110° C. for Films C, D, E and F.

Each of the pouches prepared above were immersed in the bottom portion of a water bath maintained at about 10 to 15° C., and were irradiated with UV radiation at an intensity of about 1.0 mW/cm$^2$ for 10 minutes per pouch. The UV radiation was emitted from a commercially available UV lamp in which about 90 percent of the emitted radiation had a wavelength of 300 to 400 nm with a peak at 351 nm.

The inherent viscosity (IV) of the polymerization products produced was determined as described above in order to ascertain whether or not the polymer was produced. The results are shown in Table 5 below.

TABLE 5

| Example No. | Film used for Packaging Monomer Mixture | Inherent Viscosity (dl/g) |
|---|---|---|
| 18 | Film A | 0.69 |
| 19 | Film B | 0.61 |
| 20 | Film C | 0.70 |
| 21 | Film D | 0.71 |
| 22 | Film E | 0.73 |
| 23 | Film F | 0.73 |
| 24 | Film G | Leakage of monomer and swelling of film |
| 25 | Film H | Leakage of monomer and swelling of film |
| 26 | Film I | 0.61 |

Films A to F and I were heat-sealable and the resulting polymer products showed a stable inherent viscosity in the range of 0.61 to 0.73 dl/g. Conversely, Films G and H showed leakage of the (meth)acrylate monomer.

Example 27

A pouch was prepared by forming a rectangle with a length of 4.5 cm and width of 26.6 cm from Film F. The film was folded in half in such a manner that the heat seal side of the film was on the inside. The lateral ends and bottom end of the film were heat-sealed to obtain a rectangular small container (length 4.5 cm×width 13.3 cm). Thereafter, 24 g of monomer mixture 2 was added to the container, followed by heat sealing of the upper end of the container to produce a pouch.

The pouch was immersed in a bottom portion of a water bath maintained at about 10 to 15° C., and was irradiated with UV radiation at an intensity of about 4.55 mW/cm$^2$ for 13 minutes per pouch. The UV radiation was emitted from a commercially available UV lamp in which about 90 percent of the emitted radiation had a wavelength of 300 to 400 nm with a peak at 351 nm. The polymerization product was separated from the pouch and the inherent viscosity of the product was determined as described above. The inherent viscosity was 0.74 dl/g.

Example 28-32

A (meth)acrylic copolymer was prepared using the method of Example 26 and monomer mixture 1. The packaging film in this example was Film A, and it was peeled and removed from the resulting (meth)acrylic copolymer. The (meth)acrylic copolymer (without the packaging film) was then combined with varying amounts of a separately prepared resin of a crystalline polylactic acid (LACEA® H-280, Mitsui Chemicals), and varying amounts of different packaging films (the amounts and identities of all components can be found in Table 6).

The components were melt-kneaded in a MINI MAX MOLDER kneader (Custom Scientific Instrument Inc.) for 10 minutes at 220° C. Then, the kneaded product was sandwiched between two sheets of a polyimide film having a thickness of 25 μm (UBE INDUSTRIES, Ltd.) and hot-pressed at 200° C. Films of varying thicknesses (Table 6) were obtained. The haze values were measured as described above and are reported in Table 6.

Example 33

A (meth)acrylic copolymer was prepared using the method described in Example 27 and monomer mixture 2. 70 parts by weight of a separately prepared polylactic acid resin (4032-D, Nature Works) was added to a biaxial extruder (Werner & Pfleiderer) having a diameter of 25 mm, and the above (meth)acrylic copolymer including the packaging film (Film F) was added thereto. The materials were kneaded at 230° C. for 6 minutes in the twin screw extruder. Thereafter, the resulting product was formed into pellets. The pellets were sandwiched between two sheets of a polyimide film 25 μm (UBE INDUSTRIES, Ltd.) and were hot-pressed at 200° C. A film of the PLA-containing resin having a thickness of about 100 μm was obtained. The haze value (%) of the resin film was determined as described above and is reported in Table 6.

The amounts of PLA (H280), (meth)acrylic copolymer, and the packaging film are presented in parts by weight. The identity of the packaging films can be found in the Materials above.

TABLE 6

| Example No. | PLA (H280) | (Meth)acrylic copolymer (B) | Packaging film Identity | Packaging film Amount | Film Thickness (μm) | Haze Value (%) |
|---|---|---|---|---|---|---|
| 28 | 70 | 30 | Film C | 5 | 165 | 1.5 |
| 29 | 70 | 30 | Film D | 5 | 290 | 2.8 |
| 30 | 70 | 30 | Film E | 5 | 300 | 3.0 |
| 31 | 70 | 30 | Film F | 5 | 275 | 3.1 |
| 32 | 70 | 30 | Film I | 5 | 280 | 3.0 |
| 33 | 70 | 30 | Film F | 1 | 100 | 1.9 |
| C13 | 100 | — | — | — | 110 | 2.6 |
| C14 | 70 | 30 | — | — | 170 | 2.0 |
| C15 | 70 | 30 | Film B | 5 | 145 | 74.3 |
| C16 | 70 | 30 | Film B | 1 | 170 | 36.0 |

The PLA-containing resin films of Examples 28 to 33 all have haze value that are equivalent to that of the PLA-containing resin films (Comparative Examples 13 and 14) in which the packaging films were removed.

Conversely, the PLA-containing resin films produced by melt-kneading an olefinic packaging film in place of the PLA-based packaging film (Comparative Examples 15 and 16) have a low transparency (notably increased haze values). This is because a non-compatible system was created between the packaging film and the (meth)acrylic copolymer, thereby producing a so-called "islands in a sea" structure in which the islands of the olefinic resin can be scattered in the matrix of the PLA-containing resin, causing scattering of visible light.

I claim:

1. A polylactic acid-containing resin composition comprising:
   a polylactic acid in an amount in a range of 50 to 95 weight percent based on a total weight of the resin composition; and
   a (meth)acrylic copolymer having a weight average molecular weight in a range of 50,000 to 2,000,000 g/mole in an amount in a range of 5 to 50 weight percent based on a total weight of the resin composition, wherein said (meth)acrylic copolymer is a reaction product of methyl acrylate (i); and at least one (meth)acrylic acid ester (ii) represented by formulas (i), (II), or (III):

$$CH_2=CH-COO-R^2 \quad (I)$$

$$CH_2=C(R^1)-COO-(CH_2CH_2O)_m-R^3 \quad (II)$$

$$CH_2=C(R^1)-COO-(CH_2CH_2O)_n\text{-}Ph \quad (III)$$

wherein
   $R^1$ is —H, or —$CH_3$;
   $R^2$ is a $C_2$-$C_{14}$ alkyl;
   $R^3$ is —$CH_3$, or —$CH_2CH_3$;
   Ph is —$C_6H_5$; and
   m and n are each independently an integer that is greater than or equal to 1;
   the monomer mixture is free of methyl methacrylate;
   the methyl acrylate (i) and the (meth)acrylic acid ester (ii) are blended at a weight ratio methyl acrylate (i): (meth)acrylic acid ester (ii) of 95:5 to 50:50 in the (meth)acrylic copolymer; and the (meth)acrylic copolymer has a glass transition temperature in the range of −2.5° C. to −36.5° C.

2. The polylactic acid-containing resin composition according to claim 1, wherein the polylactic acid and the (meth)acrylic copolymer constitute a miscible and single phase system blend.

3. The polylactic acid-containing resin composition according to claim 2, wherein the (meth)acrylic acid ester (ii) is a compound of formula (II) wherein m is an integer of 3 or more.

4. The polylactic acid-containing resin composition according to claim 1, wherein the polylactic acid and the (meth)acrylic copolymer constitute a partially miscible and phase-separated system blend.

5. The polylactic acid-containing resin composition according to claim 4, wherein the (meth)acrylic acid ester (ii) is a compound of formulae (I), (II), or (III) wherein m and n are each independently an integer of 1 to 3.

6. A polylactic acid-containing resin film obtained by processing the polylactic acid-containing resin composition according to claim 1 into a sheet form.

7. A polylactic acid-containing resin fiber obtained by processing the polylactic acid-containing resin composition according to claim 1 into a fiber form.

8. A method for producing a polylactic acid-containing resin composition of claim 1, wherein the (meth)acrylic copolymer is prepared by the steps of:
   combining:
   a) a monomer mixture capable of forming the (meth)acrylic copolymer upon polymerization by exposure to transmissive energy, wherein the monomer mixture comprises a methyl acrylate (i); and at least one (meth)acrylic acid ester (ii); and
   b) a packaging film for packaging the monomer mixture, wherein the packaging film comprises a polylactic acid as a main component, wherein the packaging film is at least substantially transparent to the transmissive energy; and
   exposing the combination of the monomer mixture and packaging film to the transmissive energy, thereby forming the (meth)acrylic copolymer upon polymerization of the monomer mixture; and
   wherein the (meth)acrylic copolymer and packaging film are mixed with an additional amount of polylactic acid to provide the resin composition containing 50 to 95 weight percent polylactic acid based on the total weight of the resin composition.

9. The method according to claim 8 wherein the combination of the monomer mixture and the packaging film is carried out by:
   completely surrounding the monomer mixture with the packaging film,
   substantially surrounding the monomer mixture with the packaging film,
   providing the monomer mixture on a surface of the packaging film, or
   disposing the monomer mixture between two sheets of the packaging film.

10. The method according to claim 8 wherein the packaging film is a biaxially oriented film of crystalline polylactic acid, or a two-layered or three-layered film comprising a biaxially oriented film of crystalline polylactic acid and a film of amorphous polylactic acid applied on one surface or both surfaces thereof.

11. The method according to claim 8 further comprising melt-kneading the polylactic acid and the (meth)acrylic copolymer without removing the packaging film.

12. The production method according to claim 8 wherein a transparent polylactic acid-containing resin composition is obtained.

* * * * *